United States Patent
Cooley et al.

(10) Patent No.: US 7,565,226 B1
(45) Date of Patent: Jul. 21, 2009

(54) DETERMINING OPERATING FAN SPEED FOR SYSTEMS CONTAINING DISK DRIVES TO MINIMIZE VIBRATIONAL IMPACT

(75) Inventors: John J. Cooley, Santa Clara, CA (US); Aleksey M. Urmanov, Santa Clara, CA (US); George Popescu, Santa Clara, CA (US); Kenneth C. Gross, Santa Clara, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 216 days.

(21) Appl. No.: 11/701,649

(22) Filed: Feb. 2, 2007

(51) Int. Cl.
*G01M 1/38* (2006.01)
(52) U.S. Cl. .................. 700/280; 700/300; 700/304
(58) Field of Classification Search .............. 700/280, 700/304, 299, 300
See application file for complete search history.

(56) References Cited

U.S. PATENT DOCUMENTS

2004/0027799 A1 * 2/2004 King et al. .................. 361/687

* cited by examiner

*Primary Examiner*—Kidest Bahta
*Assistant Examiner*—Nathan Laughlin
(74) *Attorney, Agent, or Firm*—Martine Penilla & Gencarella, LLP

(57) ABSTRACT

A method and an apparatus for determining cooling fan speeds that should be avoided to prevent vibational resonance with system enclosures, given ambient conditions, and/or current geographic altitude. An exemplary method to determine one or more ranges of fan speed for one or more cooling fans in a chassis with one or more systems to avoid vibrational resonance in the chassis caused by the one or more cooling fans is provided. The method includes determining a range of operable fan speed for the one or more cooling fans that meets the cooling goal of the one or more systems in the chassis, wherein the one or more cooling fans are used to cool the chassis, and the one or more systems. The method also includes scanning fan speed for the one or more cooling fans over the determined range of operable fan speed, and collecting and analyzing read or write rates on a hard disk drive in the one or more systems over the determined range of operable fan speed. The method further includes determining one or more ranges of usable fan speed that avoid vibrational resonance in the chassis caused by the one or more cooling fans, based on the collected and analyzed read or write rates.

20 Claims, 8 Drawing Sheets

DETERMINING OPERATING FAN SPEED FOR SYSTEMS CONTAINING DISK DRIVES TO MINIMIZE VIBRATIONAL IMPACT

BACKGROUND

Computer network server systems and related components are typically housed in support structures, such as racks or chassis, configured to house and to assimilate the functions of a plurality of component devices. System chassis provide efficient organization for the plurality of components for ease of access, serviceability, expandability, power distribution, cooling, etc.

These system chassis generally are housed in a computer server room, which hosts many computers and servers that all require fans to keep the systems cooled. Cooling fans come integrated with systems or are installed in larger combination systems. Alternatively, cooling fans can also be installed outside the systems. When cooling fans are installed outside systems, typically, they are installed in the same system chassis with the systems they are designed to cool. Cooling fans emit vibration with varying frequencies and intensities (or magnitudes), depending on the fan models and the running speeds. If the vibration of the cooling fans on the system chassis at a particular fan speed resonates with the system chassis, destructive amplification of vibration could cause disk drives in the system chassis to fail or to operate at less than optimal performance. Due to increases in density and reductions in size of hard disk drives (HDDs), current read/write magnetic heads are expected to read/write a track with less than about 20 nanometers in width. In addition, the read/write magnetic heads float at about 7 nanometers above the disk surface. Due to these tight tolerances, the internal vibrational resonance in the system chassis, caused by cooling fans, can cause the read/write function of hard disk drives to fail.

As a consequence, what is needed is a method to detect fan speed(s) that would result in the internal vibrational resonance with system chassis to avoid running the cooling fan at or near the identified speed(s). Avoiding operation of the cooling fans near the fan speed(s) that would cause internal vibrational resonance improves the performance hard disk drives.

SUMMARY

Broadly speaking, the present invention fills these needs by providing a method and an apparatus for determining cooling fan speeds that should be avoided to prevent vibational resonance with system enclosures, given ambient conditions, and/or current geographic altitude. When cooling fans run at a certain fan speed(s), the vibration from the cooling fans could result in vibrational resonance in the structure(s) or system(s) where the cooling fans are disposed. Vibrational resonance can degrade the read/write rates of hard disk drives. It is important to select a fan speed that does not cause vibrational resonance. In addition, altitude can affect the cooling efficiency of cooling fans at certain fan speeds. As the altitude of systems, where the cooling fans are disposed, change, the fan speed of the cooling fans needs to be adjusted to meet the cooling goals of the systems. Methods and apparatus are disclosed to identify cooling fan speeds at given altitudes that may cause vibrational resonance within the systems. These speeds are marked so that any adjustment in speed avoids these particular speeds, and thus, prevents vibrational resonance; and the performance of storage devices will not degrade or fail.

It should be appreciated that the present invention can be implemented in numerous ways, including as a process, an apparatus, a system, a device, or a method. Several inventive embodiments of the present invention are described below.

In one embodiment, a method to determine one or more ranges of fan speed for one or more cooling fans in a chassis with one or more systems to avoid vibrational resonance in the chassis, caused by the one or more cooling fans, is provided. The method includes determining a range of operable fan speed for the one or more cooling fans that meet the cooling goal of the one or more systems in the chassis, wherein the one or more cooling fans are used to cool the chassis, and the one or more systems. The method also includes scanning fan speed for the one or more cooling fans over the determined range of operable fan speed, and collecting and analyzing read rates on a hard disk drive in the one or more systems over the determined range of operable fan speed. The method further includes determining one or more ranges of usable fan speed that avoid vibrational resonance in the chassis caused by the one or more cooling fans, based on the collected and analyzed read rates.

In another embodiment, an apparatus for determining one or more ranges of fan speed for one or more cooling fans in a chassis with one or more systems, to avoid vibrational resonance in the chassis caused by the one or more cooling fan, is provided. The apparatus includes the chassis with the one or more systems, wherein the one or more systems have one or more cooling fans and at least one hard disk drive. The apparatus also includes a controlling system coupled to the one or more systems, wherein the controlling system controls fan speed of the one or more cooling fans, and collects and analyzes read rates of the at least one hard disk drive to determine one or more ranges of fan speed for the one or more cooling fans that avoid vibrational resonance in the chassis caused by the one or more cooling fans.

The advantages of the present invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

In the following description, numerous specific details are set forth in order to provide a thorough understanding of the present invention. However, it will be apparent to one skilled in the art that the present invention may be practiced without some of these specific details. In other instances, well known process operations and implementation details have not been described in detail in order to avoid unnecessarily obscuring the invention.

The invention relates to cooling of components using ambient air. A component is a system or part of a system, and may include a housing containing various elements that generate heat, a circuit board, or an individual device on a circuit board. By "cooling," it is meant that heat is removed from the component by flowing ambient air over or through the component. There may be some intermediary such as a heat exchanger, cooling fins, etc., such that the cooling may be indirect. The term "cooling" as used herein does not suggest or require a reduction in temperature. Since the component may generate heat at the same time it is being cooled, the temperature of the component may not actually go down, but will be maintained at lower temperature than would be the case if the component were not cooled.

Figure 1:
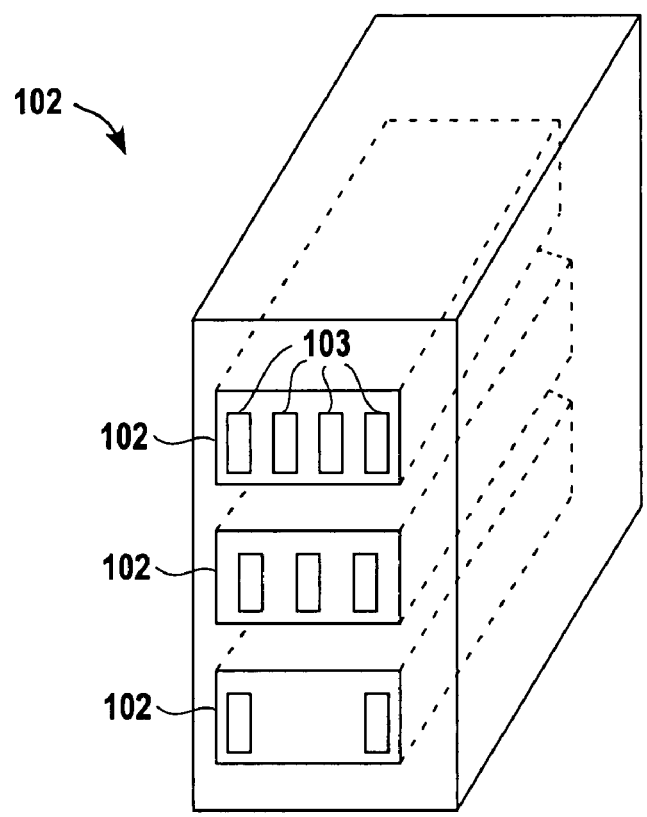
FIG. 1 shows a chassis having multiple systems, in accordance with one embodiment of the present invention.

FIG. 1 shows a chassis 100 having multiple systems 102 that includes a number of hard disk drives 103 and other devices (not shown), in accordance with one embodiment of the present invention. For illustration purposes, assume the chassis 100 is at sea level with an ambient temperature of 35° C. Ambient temperature would affect the cooling effect of the cooling fans.

Figure 2:
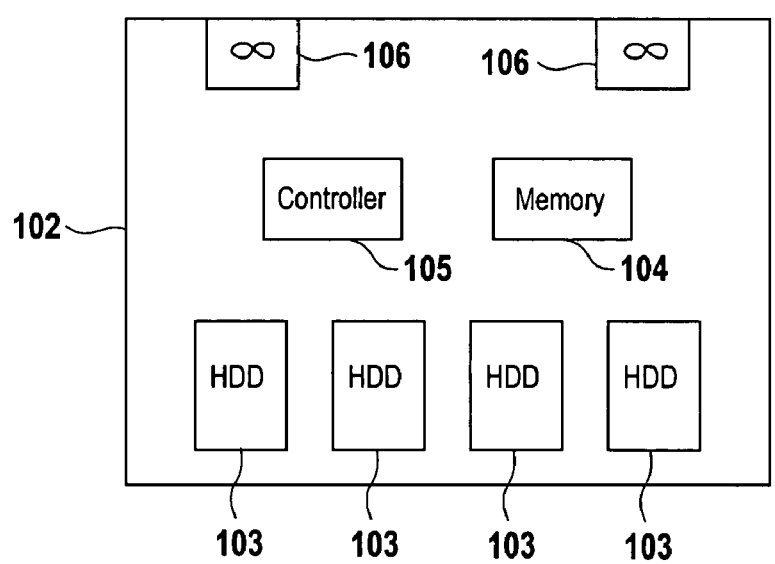
FIG. 2 shows a system having a number of components, in accordance with one embodiment of the present invention.

FIG. 2 shows a system 102 having a number of hard disk drives 103, other devices, such as a memory 104 and a controller 105 on a circuit board (not shown) coupled to the hard disk drives, and a number of cooling fans 106, in accordance with one embodiment of the present invention. The cooling fans 106 provide ventilation by blowing air across the circuit board, memory 104, controller 105, and disk drives 103 in system 102. At higher altitudes, since the air is thinner, the cooling fans would operate at higher speed to ensure the system 102 is sufficiently cooled. In contrast, at lower altitudes, the cooling fans can operate at lower speeds. Details of how to set fan speed at a certain altitude to compensate for air density change is detailed in commonly assigned U.S. patent application Ser. No. 11/270,396, titled "Automatic Altitude Compensation In Airflow Adjustment." The content of U.S. patent application Ser. No. 11/270,396 are incorporated herein by reference.

Vibration emitted by cooling fans varies with fan speed, which is affected by the altitude of the location where the chassis 100 and systems 102 are installed, due to the variation of air density with altitude. Since cooling fans are operated at fan speeds depending on the altitudes of the installation locations, internal vibrational resonance caused by the cooling fans needs to be evaluated at the installation location. Pre-measurement at the factory at a certain altitude might not work since the chassis 100 and systems 102 might be installed and operated at altitudes different from the altitude of pre-measurement.

Figure 3:
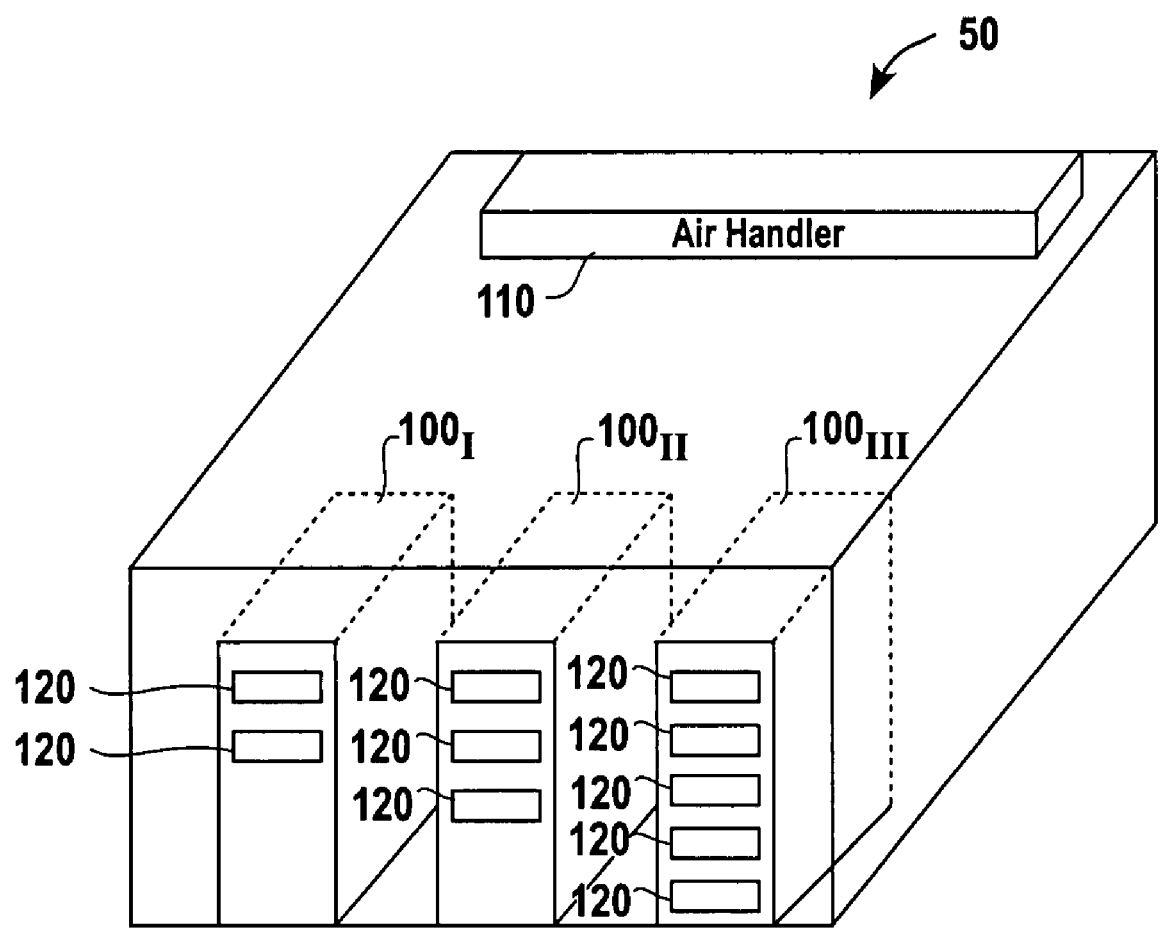
FIG. 3 shows a data center with a number of chassis, in accordance with one embodiment of the present invention.

FIG. 3 shows a data center 50 with a number of chassis $100_I$, $100_{II}$, $100_{III}$, and an air handler 110, in accordance with one embodiment of the present invention. Chassis $100_I$, $100_{II}$, and $100_{III}$ have different number of systems 102, which have a number of fans 106 (not shown) installed to cool the components on the systems. Chassis $100_I$, $100_{II}$, and $100_{III}$ can have same or different number of fans. Typically, if a chassis, such as chassis $100_{III}$, has a higher number of systems, there would be a higher number of cooling fans in the chassis. During daily operation, the components installed in the chassis $100_I$, $100_{II}$, $100_{III}$, such as numbers and configuration of systems 102, can change according to variation in need. Changes in configuration, such as installing slots of systems 102, in chassis $100_I$, $100_{II}$, and $100_{III}$ and changes in configuration in each the systems 102 could change the impact of cooling fan vibration to chassis $100_I$, $100_{II}$, and $100_{III}$. Therefore, vibrational resonance caused by the cooling fans need to be re-evaluated after configuration change to chassis $100_I$, $100_{II}$, and $100_{III}$, or to systems 102.

Figure 4:
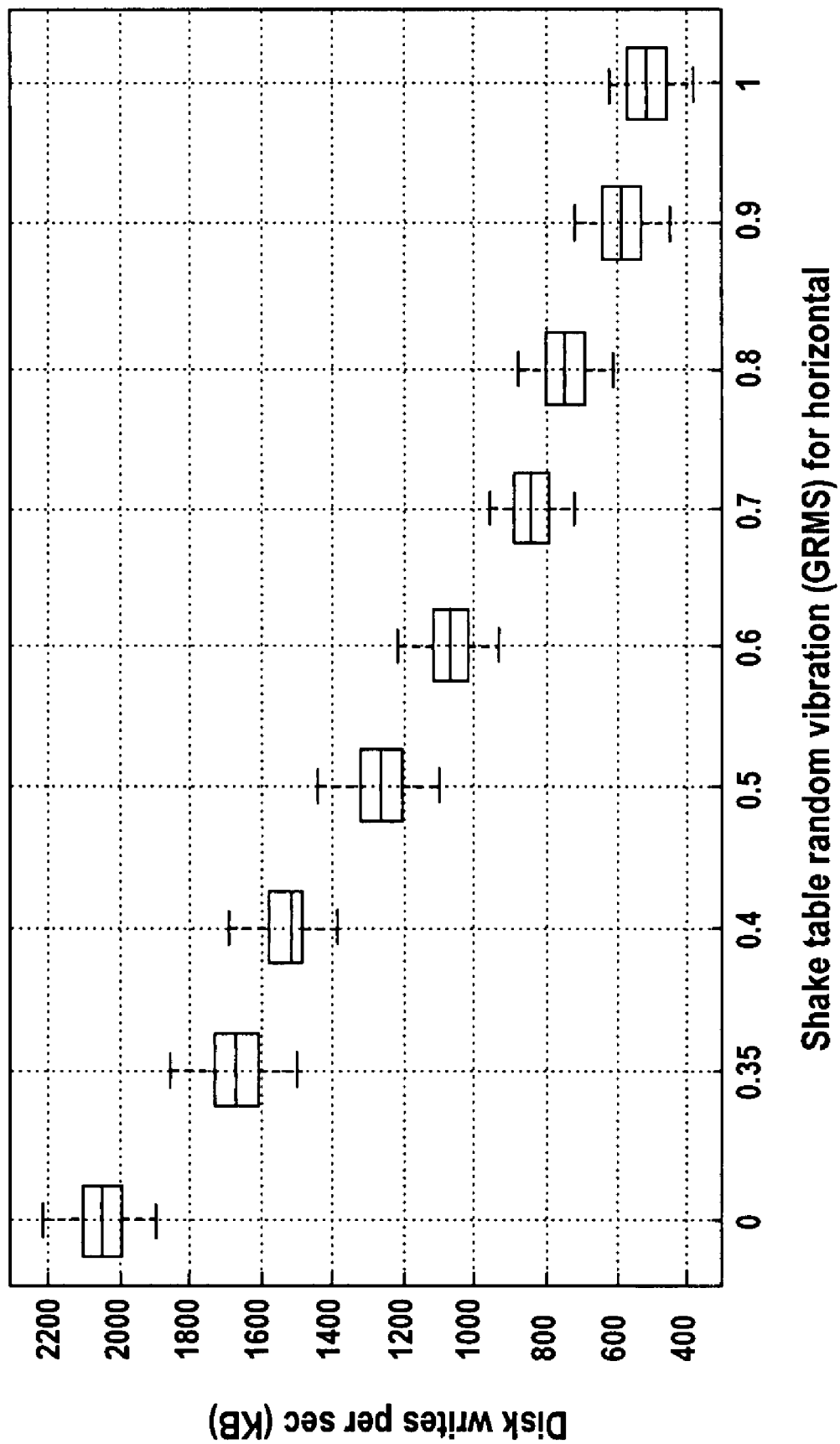
FIG. 4 shows a graph of hard disk drive "write" throughput as a function of vibration.

FIG. 4 shows a graph of hard disk drive "write" throughput as a function of vibration. The study is conducted by measuring hard disk write speed, measured in kilo-bits/sec (KB/sec), by securing a hard disk drive on a shake table. The shake table provides horizontal random vibration. The measurement GRMS for vibration in FIG. 4 is a root mean square measure (RMS) of acceleration expressed in units of "G" force, which is the acceleration due to gravity (32 ft/sec$^2$). The results in FIG. 4 show that hard disk write throughput decreases with the increase of horizontal random vibration.

Figure 5:
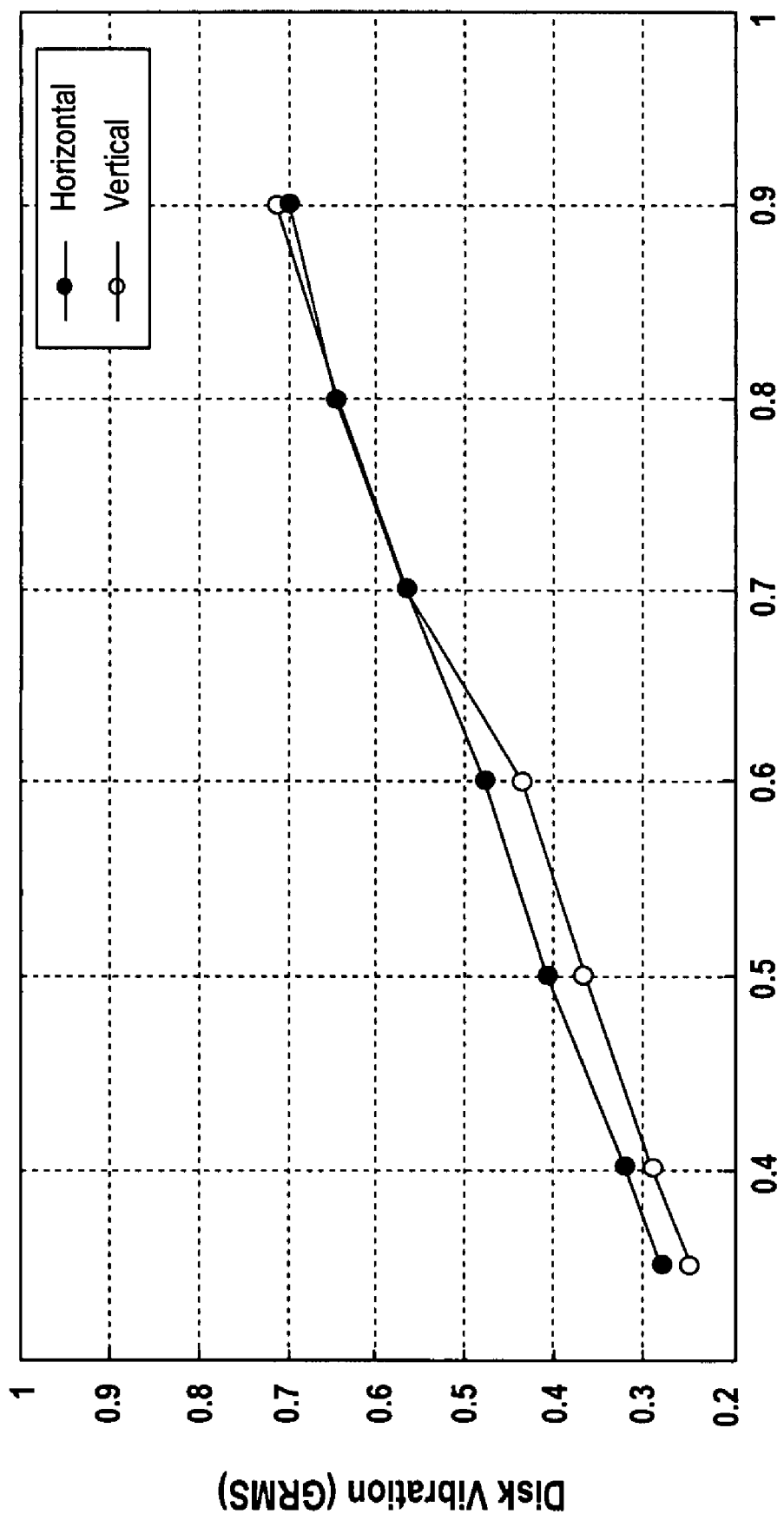
FIG. 5 shows a graph correlating hard disk vibration with shake table vibration.

FIG. 5 shows a graph correlating hard disk vibration with shake table vibration (both vertical and horizontal vibrations). The results demonstrate nearly linear correlation between the disk vibration and shake table vibration for both vertical and horizontal vibrations. The results indicate that the degradation of write throughput in FIG. 4 is caused by the vibration of the disk drive, as a result of vibrational movement of the shake table. The random vibration of the dish drive causes the magnetic head to skip track horizontally or vertically. Although the vibration caused by the cooling fan might not be as severe as the shake table, the vibration caused by cooling fans can also result in degradation of read or write throughput.

Figure 6:
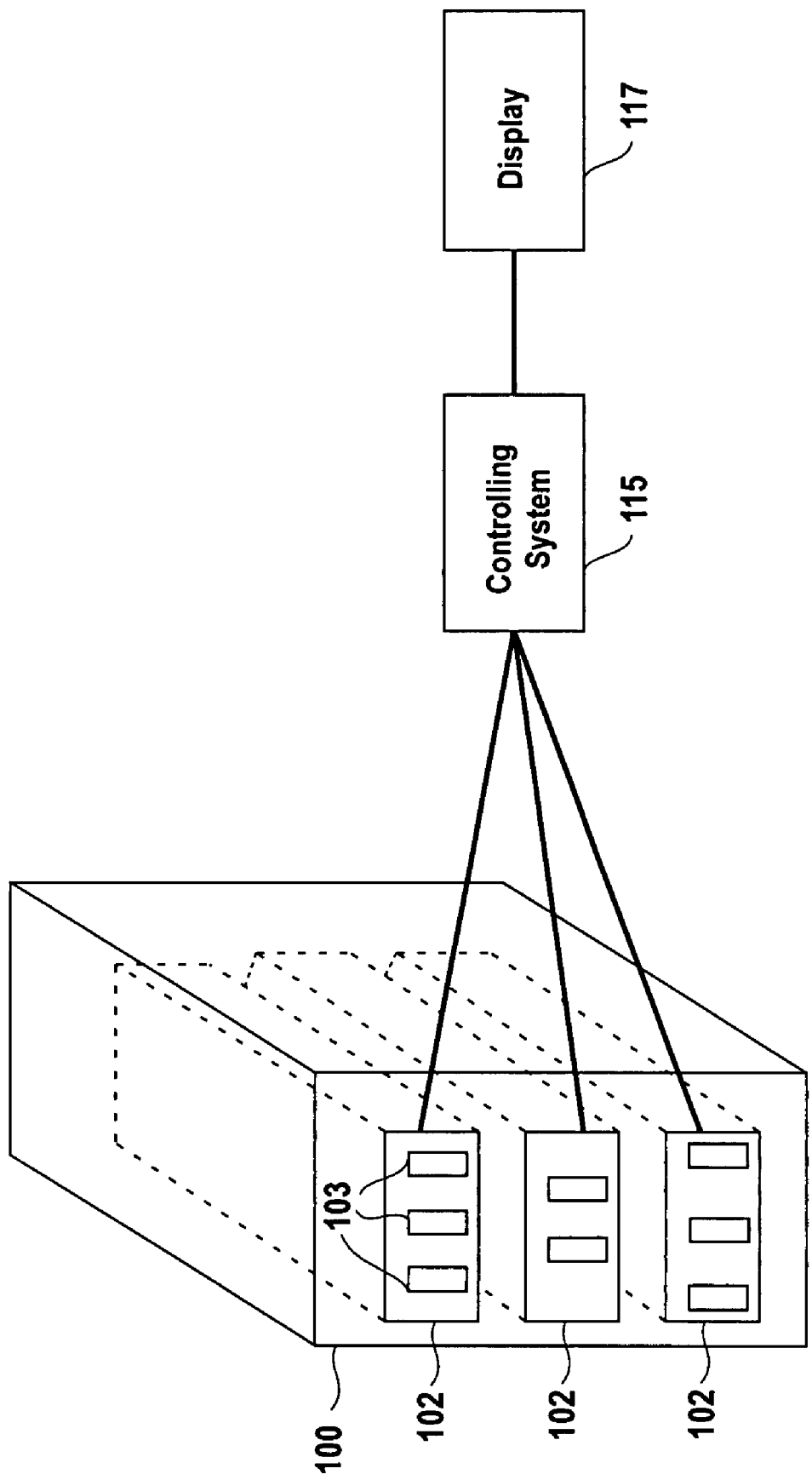
FIG. 6 shows a chassis with a number of systems coupled to a controlling system and a display, in accordance with one embodiment of the present invention.

FIG. 6 shows a chassis 100 with a number of systems 102. Systems 102 are coupled to a controlling system 115, which is coupled to a display 117, in accordance with one embodiment of the present invention. Each system 102 has one or more hard disk drives 103. The controlling system 115 sends controlling signals to systems 102 to control the speed of cooling fans 106 (not shown in FIG. 6) on systems 102 on chassis 100. As described above, details of how to set fan speed at a certain altitude to compensate for air density change is detailed in commonly assigned U.S. patent application Ser. No. 11/270,396, titled "Automatic Altitude Compensation In Airflow Adjustment." In one embodiment, the controlling system 115 has one or more computers and one or more controllers. The computers control the controllers.

Alternatively, cooling fans may be controlled to a specific speed using controller(s), which may be a stand-alone fan controller as shown, integrated with a circuit board, or integrated with a cooling fan. In one embodiment, the controller may be implemented in a single integrated circuit chip. The fan speed may additionally be controlled based on ambient temperature, or temperature of a component in one of systems 102.

Alternatively, the controlling systems include a pressure sensor signal input (not shown) providing a signal indicative of an ambient air pressure, which indicates a local altitude. In one embodiment, the controlling system 115 also collects read rate(s) (or throughput) of magnetic head(s) from one or more disk drives 103 on systems 102. The controlling command (or script) and read rate measurement results can be displayed on display 117. In this embodiment, the "read" throughput data collection is chosen to over the "write" throughput data collection to avoid affecting the content of the disk drives 103. The fan speed of the cooling fans is scanned through a pre-determined operational range, within which the cooling capacity of the cooling fans in chassis 100 and systems 102 is able to achieve the desired cooling goal. In one embodiment, the read rate(s) (or throughput) is analyzed to show in a graph correlating the read rate(s) and fan speed.

Figure 7A:
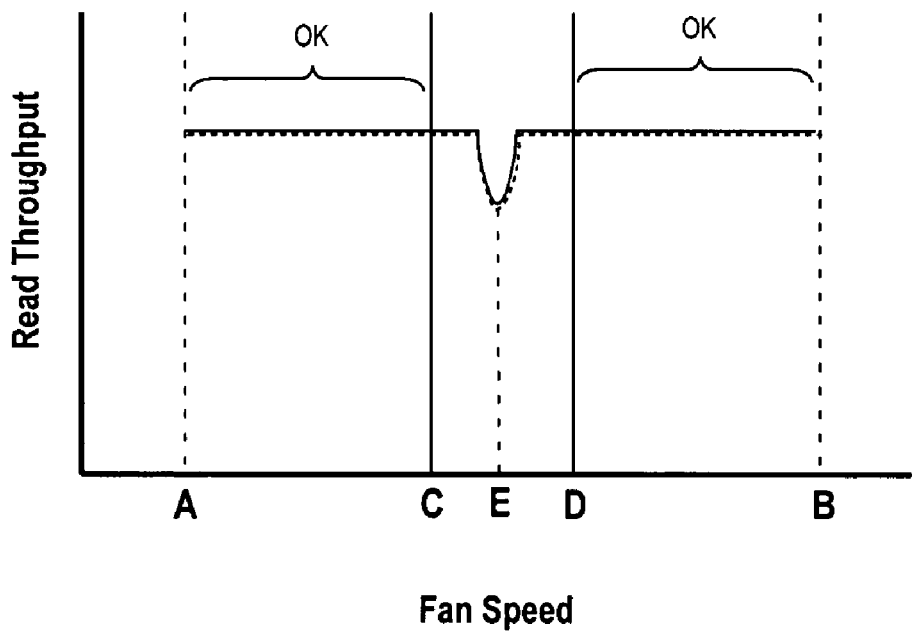
FIG. 7A shows a graph of "read" rate as a function of fan speed, in accordance with one embodiment of the present invention.

FIG. 7A shows a graph of read rate(s) as a function of fan speed. The fan speed is scanned between speed A and speed B, in accordance with one embodiment of the present invention. Within the range between speed A and speed B, the cooling capacity of the cooling fans is sufficient to cool off the systems 102 and devices in the chassis 100 to meet the cooling goal. As shown in FIG. 7A, as fan speed is near speed E, the read rate(s) decreases significantly. The vibration of cooling fans running at speed near E result in vibrational resonance, which causes the magnetic head(s) to miss or to skip track(s) and decrease in read rate of hard disk drives. The effect of vibrational resonance on the read rate depends on the running speed, the number and the types of cooling fans, which also determine the accumulative vibrational frequency of the fans. If the accumulative vibrational frequency of the cooling fans in the chassis 100 with systems 102 coincides with the natural vibational frequency of the chassis 100 with systems 102, the chassis 100 and systems 102 would oscillate with high amplitude and would cause the read rate to drop. Alternatively, systems 102 with cooling fans not installed in a chassis 100 can also have vibrational resonance. Similar studies can also be conducted on independent systems 102 to determine cooling fan speeds to avoid. To avoid running the fans at a speed that would cause vibrational resonance, fan speeds C and D are selected to be at safe distances from speed E to avoid vibrational resonance. The regions between speed A and speed C, and between speed D and B are safe to operate the fan speed.

Figure 7B:
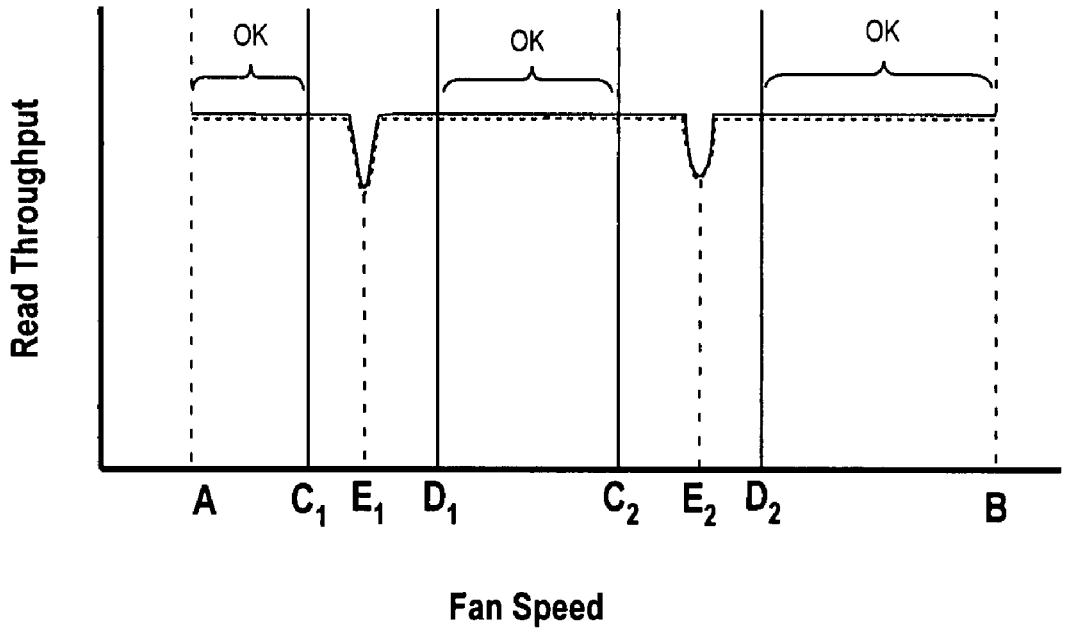
FIG. 7B shows another graph of "read" rate as a function of fan speed, in accordance with another embodiment of the present invention.

FIG. 7B shows another plot of read rate(s) as a function of fan speed. In this plot, there are more than one fan speeds that cause vibrational resonance and affect read rate(s), in accordance with another embodiment of the present invention. At both speeds E1 and E2, the vibrations from the fan speeds cause the read rate to decrease. Similar to FIG. 7A, regions between speed A and C1, between D1 to C2, and between D2 to B are safe regions to operate.

Figure 8:
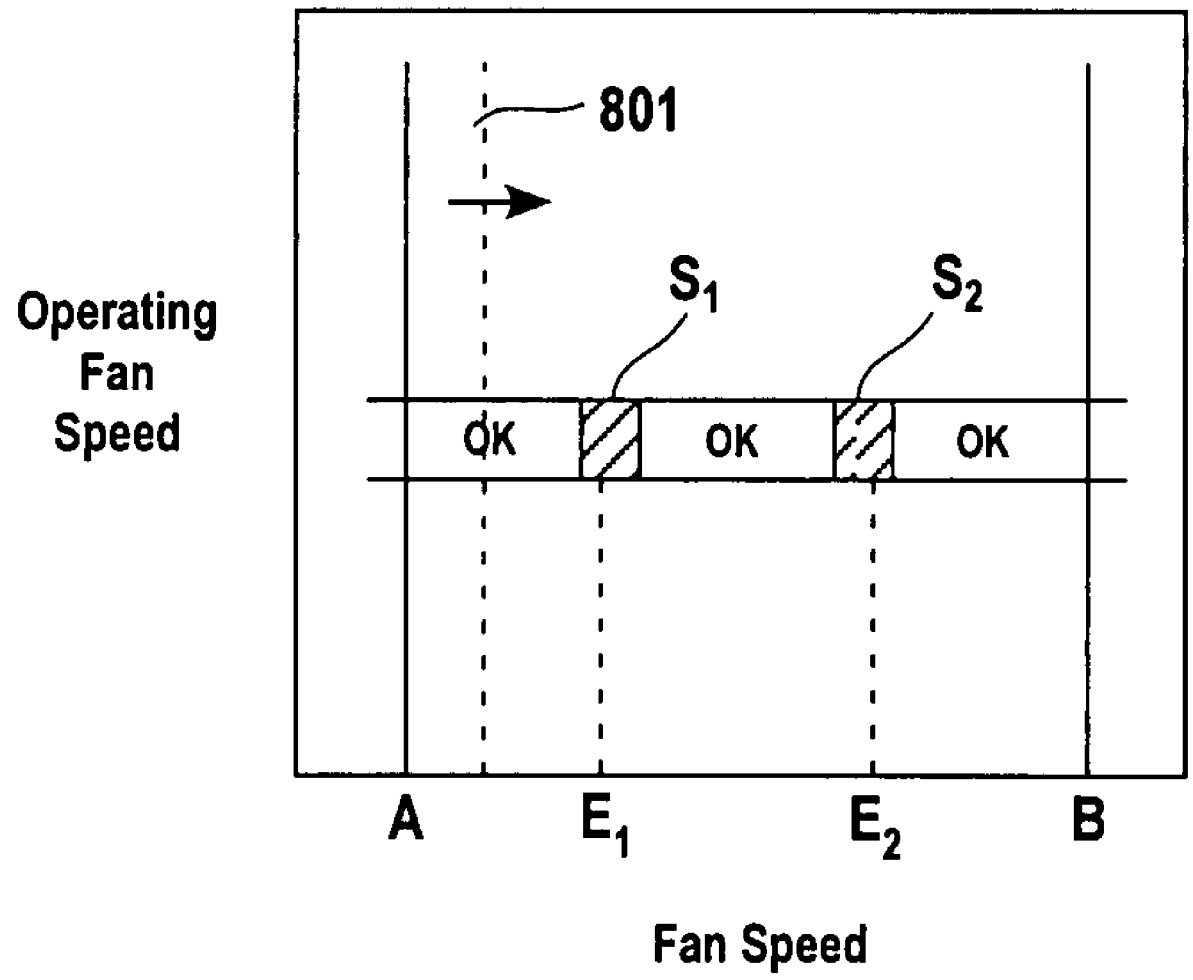
FIG. 8 shows a graphical user interface with manual fan speed adjustment for systems in a chassis based on read rate study, in accordance with one embodiment of the present invention.

FIG. 8 shows a graphical user interface (GUI) that shows manual fan speed adjustment for systems 102 in chassis 100 based on read rate study on hard disk drives in chassis 100 conducted previously, in accordance with one embodiment of the present invention. The read rate study highlighted a couple of fan regions S1, S2 near speeds E1 and E2 to avoid. During fan speed adjustment, a user manually scans the fan speed pointer 801 between speed A and speed B. The program based on the read rate study would disallow the fan speed pointer 801 to choose an operating fan speed in regions S1 and S2.

Figure 9:
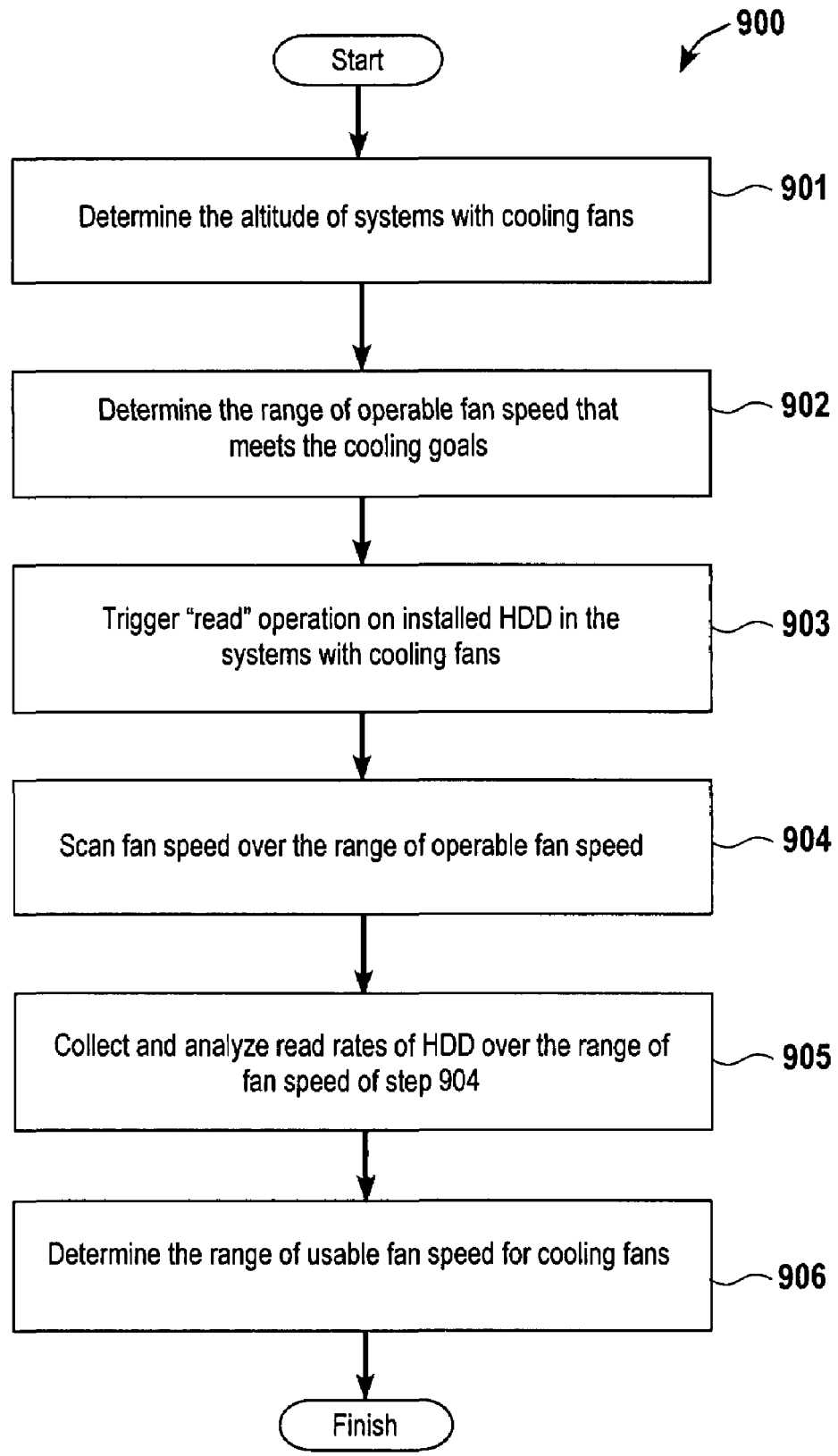
FIG. 9 shows a process flow that demonstrates how to determine a range of operating cooling fan speed, in accordance with one embodiment of the present invention.

FIG. 9 shows a process flow 900 that demonstrates how a range(s) of operating cooling fan speed, without causing vibrational resonance to the chassis and systems where the cooling fans are housed, is determined, in accordance with one embodiment of the present invention. At step 901, the altitude of the chassis and systems with fans is determined. In one embodiment, the operation of determining the altitude of the systems can be merely placing the chassis and systems on the location with the particular altitude. Both the systems and the cooling fans can be one or more. At step 902, the range of operable fan speed that meets the cooling goal is determined. As described above, details of how to set fan speed at a certain altitude to compensate for air density change is detailed in commonly assigned U.S. patent application Ser. No. 11/270,396, titled "Automatic Altitude Compensation In Airflow Adjustment."

At step 903, the "read" operation on installed hard disk drive(s) (HDD) in the systems with fans is triggered. At step 904, fan speed over the range of operable fan speed for the altitude, determined in step 902, is scanned on the fans of the systems. At step 905, read rate of the HDD over the range of fan speed scanned in step 904 is collected and analyzed. The read rates can be collected on one or more HDDs. At step 906, the range(s) of usable fan speed is determined. Once the range(s) of usable fan speed is determined, the user or the system can select fan speed for the cooling fans while avoiding vibrational resonance and ensuring the good performance of hard disk drives.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method to determine one or more ranges of fan speeds for one or more cooling fans in a chassis with one or more systems to avoid vibrational resonance in the chassis caused by the one or more cooling fans comprising:

determining a range of operable fan speeds for the one or more cooling fans that meets a cooling goal of the one or more systems in the chassis, wherein the one or more cooling fans are used to cool the chassis, and the one or more systems;

scanning fan speeds for the one or more cooling fans over the determined range of operable fan speeds;

collecting and analyzing read or write rates on a hard disk drive in the one or more systems over the determined range of operable fan speeds; and determining one or more ranges of usable fan speeds that avoid vibrational resonance in the chassis caused by the one or more cooling fans, based on the collected and analyzed read or write rates, so that fan speeds that avoid vibrational resonance are selected, wherein the determining one or more ranges is performed by a controlling system.

2. The method of claim 1, wherein the operation of determining a range of operable fan speeds further comprising:

determining an altitude of a location where the chassis with the one or more systems is disposed, wherein the altitude affects the cooling effect of the one or more cooling fans different fan speeds.

3. The method of claim 1, wherein the operation of determining a range of operable fan speeds further comprising:

determining an ambient temperature of a location where the chassis with the one or more systems is disposed, wherein the ambient temperature affects the cooling effect of the one or more cooling fans different fan speeds.

4. The method of claim 1, further comprising:
triggering read operation on the hard disk drive prior to the operation of scanning fan speeds and the operation of collecting and analyzing read or write rates.

5. The method of claim 1, wherein the operation of collecting and analyzing read or write rates further comprising:
plotting the collected read or write rates as a function of fan speed to determine one or more fan speeds that cause substantial decrease in the collected read or write rates.

6. The method of claim 5, wherein the determined one or more ranges of usable fan speeds exclude fan speeds near the determined one or more fan speeds that cause substantial decrease in collected read or write rates.

7. The method of claim 1, wherein the one or more cooling fans is used to cool components in the one or more systems.

8. The method of claim 1, wherein the method needs to be repeated when the configuration of the chassis or the one or more systems are changed.

9. The method of claim 2, wherein the method needs to be repeated when the altitude of the location, where the chassis with the one or more systems is disposed, is changed.

10. The method of claim 2, wherein the chassis is disposed in a clean room and the clean room has its own cooling devices.

11. The method of claim 1, wherein the operation of collecting and analyzing read or write rates is conducted on a plurality of hard disk drives in the one or more systems.

12. An apparatus for determining one or more ranges of fan speeds for one or more cooling fans in a chassis with one or more systems to avoid vibrational resonance in the chassis caused by the one or more cooling fans comprising:
the chassis with the one or more systems, wherein the one or more systems have one or more cooling fans and at least one hard disk drive; and
a controlling system coupled to the one or more systems, wherein the controlling system controls fan speeds of the one or more cooling fans, and collects and analyzes read or write rates of the at least one hard disk drive to determine one or more ranges of fan speeds for the one or more cooling fans that avoid vibrational resonance in the chassis caused by the one or more cooling fans.

13. The apparatus of claim 12, further comprising:
a display coupled to the controlling system, wherein the display is capable of showing controlling command issued by the controlling system, collected read or write rates of the at least one hard disk drive.

14. The apparatus of claim 13, wherein the collected read or write rates are displayed as a function of fan speed in a graph.

15. The apparatus of claim 12, wherein the controlling system comprises at least a computer and one or more controllers that control the fan speeds of one or more cooling fans.

16. The apparatus of claim 12, wherein the controlling system comprises a pressure sensor signal input providing a signal indicative of an ambient air pressure, which indicates a local altitude.

17. The apparatus of claim 12, wherein the controlling system comprises a temperature sensor signal input providing a signal indicative of an ambient temperature.

18. The apparatus of claim 12, wherein the controlling system comprises at least one computer.

19. The apparatus of claim 12, wherein the controlling system comprises at least one controller.

20. The apparatus of claim 12, wherein the controlling system has one or more controllers, which are coupled to the one or more cooling fans.

* * * * *